United States Patent
Pulipati et al.

(10) Patent No.: US 12,267,679 B2
(45) Date of Patent: Apr. 1, 2025

(54) INTER-PLMN COMMUNICATION

(71) Applicant: Nokia Technologies Oy, Espoo (FI)

(72) Inventors: Narasimha Rao Pulipati, Redmond, WA (US); Saurabh Khare, Bangalore (IN); Bruno Landais, Pleumeur-Bodou (FR)

(73) Assignee: Nokia Technologies Oy, Espoo (FI)

( * ) Notice: Subject to any disclaimer, the term of this patent is extended or adjusted under 35 U.S.C. 154(b) by 307 days.

(21) Appl. No.: 18/047,355

(22) Filed: Oct. 18, 2022

(65) Prior Publication Data
US 2023/0141233 A1   May 11, 2023

(30) Foreign Application Priority Data
Nov. 5, 2021   (IN) .............................. 202141050756

(51) Int. Cl.
*H04W 92/02*   (2009.01)
*H04W 12/069*   (2021.01)
(Continued)

(52) U.S. Cl.
CPC ....... *H04W 12/086* (2021.01); *H04W 12/069* (2021.01); *H04W 12/106* (2021.01);
(Continued)

(58) Field of Classification Search
CPC ............... H04L 63/166; H04L 63/0823; H04L 63/1483; H04L 67/56; H04L 63/1441;
(Continued)

(56) References Cited

U.S. PATENT DOCUMENTS 11,076,281 B1 *  7/2021  Yau .................... H04W 8/12
11,825,310 B2 *  11/2023 Rajput .............. H04W 36/0038
(Continued)

FOREIGN PATENT DOCUMENTS

WO        2020/053480 A1     3/2020
WO    WO-2020094914 A1 *    5/2020    ......... H04L 61/3025
(Continued)

OTHER PUBLICATIONS

Oracle, "Cloud Native Security Edge Protection Proxy (SEPP) User's Guide", Sep. 2020, obtained online from <https://docs.oracle.com/en/industries/communications/cloud-native-core/2.3.1/sepp_user_guide/intoduction.html#GUID-9504266C-F3A9-4027-88E9-D7BDE4C1E9D3>, retrieved on Jul. 26, 2024 (Year: 2020).*

(Continued)

*Primary Examiner* — Zhimei Zhu
(74) *Attorney, Agent, or Firm* — Nokia Technologies Oy

(57) ABSTRACT

There is disclosed an apparatus. The apparatus comprises means for performing: initiating establishment of an N32-c transport layer security connection with an entity, the apparatus located in a first public land mobile network and the entity located in a second public land mobile network; sending from the apparatus to the entity on the N32-c transport layer security connection an N32-c handshake signalling message comprising domain name information of the apparatus to be used by the entity for establishing an N32-f transport layer security connection towards the apparatus; receiving a reply from the entity, the reply comprising domain name information of the entity to be used by the apparatus for establishing the N32-f transport layer security connection towards the entity; and using the domain name information received in the reply to establish the N32-f transport layer security connection towards the entity.

20 Claims, 8 Drawing Sheets

(51) Int. Cl.
  *H04W 12/086* (2021.01)
  *H04W 12/106* (2021.01)
  *H04W 48/16* (2009.01)
  *H04W 48/18* (2009.01)
  *H04W 76/10* (2018.01)
  *H04L 9/40* (2022.01)
  *H04L 67/56* (2022.01)
  *H04W 84/04* (2009.01)

(52) U.S. Cl.
  CPC .......... *H04W 48/16* (2013.01); *H04W 48/18* (2013.01); *H04W 76/10* (2018.02); *H04W 92/02* (2013.01); *H04L 63/0823* (2013.01); *H04L 63/166* (2013.01); *H04L 67/56* (2022.05); *H04W 84/042* (2013.01)

(58) Field of Classification Search
  CPC . H04W 84/042; H04W 12/12; H04W 12/122; H04W 36/0038; H04W 48/16; H04W 48/18; H04W 8/02; H04W 12/086; H04W 12/069; H04W 12/106; H04W 76/10; H04W 76/15; H04W 92/02
  See application file for complete search history.

(56) References Cited

U.S. PATENT DOCUMENTS

| | | | | |
|---|---|---|---|---|
| 2020/0036754 | A1* | 1/2020 | Livanos | H04W 48/16 |
| 2021/0014284 | A1 | 1/2021 | Lehtovirta et al. | |
| 2022/0022040 | A1* | 1/2022 | Mahalank | H04L 67/141 |
| 2022/0030413 | A1* | 1/2022 | Ben Henda | H04W 12/06 |
| 2022/0104020 | A1* | 3/2022 | Rajput | H04W 12/12 |
| 2022/0104112 | A1* | 3/2022 | Rajput | H04L 67/56 |
| 2024/0022910 | A1* | 1/2024 | Li | H04W 12/037 |

FOREIGN PATENT DOCUMENTS

| | | |
|---|---|---|
| WO | 2021/099676 A1 | 5/2021 |
| WO | 2021/189828 A1 | 9/2021 |

OTHER PUBLICATIONS

"3rd Generation Partnership Project; Technical Specification Group Core Network and Terminals; 5G System; Public Land Mobile Network (PLMN) Interconnection; Stage 3 (Release 17)", 3GPP TS 29.573, V17.2.0, Sep. 2021, pp. 1-102.

"3rd Generation Partnership Project; Technical Specification Group Services and System Aspects; Security architecture and procedures for 5G system (Release 17)", 3GPP TS 33.501, V17.2.1, Jun. 2021, pp. 1-257.

"Proposed allocation of documents to agenda items for CT4#105E: chair notes final", 3GPP TSG-CT WG4 Meeting #105E, C4-214004, Agenda: 2, Chairman, TSG-CT WG4, Aug. 17-26, 2021, pp. 1-561.

"3rd Generation Partnership Project; Technical Specification Group Services and System Aspects; Network Domain Security (NDS); Authentication Framework (AF) (Release 16)", 3GPP TS 33.310, V16.8.0, Jun. 2021, pp. 1-59.

"PLMN Specific N32-C connection", 3GPP TSG-CT WG4 Meeting #105-e, C4-214328, Nokia, Aug. 17-27, 2021, 6 pages.

"SEPP capability negotation", 3GPP TSG-CT WG4 Meeting #105-e, C4-214333, Nokia, Aug. 17-27, 2021, 9 pages.

Rescorla, "HTTP Over TLS", RFC 2818, Network Working Group, May 2000, pp. 1-7.

"3rd Generation Partnership Project; Technical Specification Group Services and System Aspects; System architecture for the 5G System (5GS); Stage 2 (Release 17)", 3GPP TS 23.501, V17.1.1, Jun. 2021, pp. 1-526.

"N32c and N32f TLS correlation", 3GPP TSG-CT WG4 Meeting #107-e, C4-215abc, Nokia, Nov. 15-23, 2021, 9 pages.

"Security Edge Protection Proxy (SEPP) Cloud Native Installation Guide", SEPP Architecture, Retrieved on Nov. 11, 2022, Webpage available at : https://docs.oracle.com/communications/F25434_01/docs.10/SEPP%20Installation%20Guide/GUID-092F8DE7-E953-4D71-9777-B16EA3A5BFE7.htm.

Extended European Search Report received for corresponding European Patent Application No. 22201763.4, dated Mar. 15, 2023, 10 pages.

"Informative Annex on End to End Call Flow via SEPP", 3GPP TSG-CT WG4 Meeting #90, C4-191016, Huawei, Apr. 8-12, 2019, 13 pages.

"5G; 5G System; Public Land Mobile Network (PLMN) Interconnection; Stage 3 (3GPP TS 29.573 version 16.6.0 Release 16)", ETSI TS 129 573, V16.6.0, Apr. 2021, 103 pages.

"On the alignment of N32 terminology", 3GPP TSG SA WG3 (Security) Meeting #92, S3-182335, Agenda: 7.1.13.1, Deutsche Telekom AG, Aug. 20-24, 2018, 2 pages.

* cited by examiner

INTER-PLMN COMMUNICATION

TECHNICAL FIELD

This disclosure relates to wireless communications. More particularly, the present disclosure relates to wireless communications between public land mobile networks (PLMNs).

BACKGROUND

A communication system can be seen as a facility that enables communication between two or more devices such as user terminals, machine-like terminals, base stations and/or other nodes by providing communication channels for carrying information between the communicating devices. A communication system can be provided for example by means of a communication network and one or more compatible communication devices. The communication may comprise, for example, communication of data for carrying data for voice, electronic mail (email), text message, multimedia and/or content data communications and so on. Non-limiting examples of services provided include two-way or multi-way calls, data communication or multimedia services and access to a data network system, such as the Internet.

In a wireless system at least a part of communications occurs over wireless interfaces. Examples of wireless systems include public land mobile networks (PLMN), satellite based communication systems and different wireless local networks, for example wireless local area networks (WLAN). A local area wireless networking technology allowing devices to connect to a data network is known by the tradename WiFi (or Wi-Fi). WiFi is often used synonymously with WLAN. The wireless systems can be divided into cells, and are therefore often referred to as cellular systems. A base station provides at least one cell.

A user can access a communication system by means of an appropriate communication device or terminal capable of communicating with a base station. Hence nodes like base stations are often referred to as access points. A communication device of a user is often referred to as user equipment (UE). A communication device is provided with an appropriate signal receiving and transmitting apparatus for enabling communications, for example enabling communications with the base station and/or communications directly with other user devices. The communication device can communicate on appropriate channels, e.g. listen to a channel on which a station, for example a base station of a cell, transmits.

A communication system and associated devices typically operate in accordance with a given standard or specification which sets out what the various entities associated with the system are permitted to do and how that should be achieved. Communication protocols and/or parameters which shall be used for the connection are also typically defined.

Since introduction of fourth generation (4G) services increasing interest has been paid to the next, or fifth generation (5G) standard. 5G may also be referred to as a New Radio (NR) network.

In some situations, communication between PLMNs is required, for example for communication between 5G core (5GC) networks. For example, communication between PLMNs may be required in roaming and interconnect scenarios.

SUMMARY

According to a first aspect there is provided an apparatus comprising means for performing: initiating establishment of an N32-c transport layer security connection with an entity, the apparatus located in a first public land mobile network and the entity located in a second public land mobile network; sending from the apparatus to the entity on the N32-c transport layer security connection an N32-c handshake signalling message comprising domain name information of the apparatus to be used by the entity for establishing an N32-f transport layer security connection towards the apparatus; receiving a reply from the entity, the reply comprising domain name information of the entity to be used by the apparatus for establishing the N32-f transport layer security connection towards the entity; and using the domain name information received in the reply to establish the N32-f transport layer security connection towards the entity.

According to some examples the domain name information of the apparatus comprises a fully qualified domain name, and the domain name information of the entity comprises a fully qualified domain name.

According to some examples the means are further configured to perform using the reply from the entity for setting a request Uniform Resource Identifier for N32-f Hypertext Transfer Protocol Secure messages towards the entity.

According to some examples the means are further configured to, in response to receiving the reply from the entity, establish the N32-f transport layer security connection towards the entity with a server name indication set to the domain name information received in the reply.

According to some examples the means are further configured to receive from the entity information of an N32-c transport layer security connection that is correlated with the N32-f transport layer security connection.

According to some examples the means are further configured to perform sending a N32-c signalling request to the entity for termination of the N32-f transport layer security connection and the correlated N32-c transport layer security connection.

According to some examples the means are further configured to perform sending a request to the entity for renegotiation of the N32-f transport layer security connection and the correlated N32-c transport layer security connection.

According to some examples the means are further configured to receive from the entity fully qualified domain name information for the N32-f transport layer security connection as one of: a wildcard transport layer security certificate; a transport layer security certificate applicable to a list of one or more valid fully qualified domain names.

According to some examples the N32-c handshake signalling procedure corresponds to a N32-c security capability negotiation.

According to some examples the apparatus comprises an initiating security edge protection proxy and the entity comprises a responding security edge protection proxy.

According to some examples, the means comprises at least one processor; and at least one memory including computer program code, the at least one memory and computer program code configured to, with the at least one processor, cause the performance of the apparatus.

According to a second aspect there is provided an apparatus comprising at least one processor; and at least one memory including computer program code; the at least one memory and the computer program code configured to, with the at least one processor, cause the apparatus at least to perform: initiating establishment of an N32-c transport layer security connection with an entity, the apparatus located in a first public land mobile network and the entity located in a second public land mobile network; sending from the apparatus to the entity on the N32-c transport layer security connection an N32-c handshake signalling message comprising domain name information of the apparatus to be used by the entity for establishing an N32-f transport layer security connection towards the apparatus; receiving a reply from the entity, the reply comprising domain name information of the entity to be used by the apparatus for establishing the N32-f transport layer security connection towards the entity; and using the domain name information received in the reply to establish the N32-f transport layer security connection towards the entity.

According to a third aspect there is provided an apparatus comprising: circuitry for initiating establishment of an N32-c transport layer security connection with an entity, the apparatus located in a first public land mobile network and the entity located in a second public land mobile network; circuitry for sending from the apparatus to the entity on the N32-c transport layer security connection an N32-c handshake signalling message comprising domain name information of the apparatus to be used by the entity for establishing an N32-f transport layer security connection towards the apparatus; circuitry for receiving a reply from the entity, the reply comprising domain name information of the entity to be used by the apparatus for establishing the N32-f transport layer security connection towards the entity; and circuitry for using the domain name information received in the reply to establish the N32-f transport layer security connection towards the entity.

According to a fourth aspect there is provided a method performed by an apparatus comprising: initiating establishment of an N32-c transport layer security connection with an entity, the apparatus located in a first public land mobile network and the entity located in a second public land mobile network; sending from the apparatus to the entity on the N32-c transport layer security connection an N32-c handshake signalling message comprising domain name information of the apparatus to be used by the entity for establishing an N32-f transport layer security connection towards the apparatus; receiving a reply from the entity, the reply comprising domain name information of the entity to be used by the apparatus for establishing the N32-f transport layer security connection towards the entity; and using the domain name information received in the reply to establish the N32-f transport layer security connection towards the entity.

According to some examples the domain name information of the apparatus comprises a fully qualified domain name, and the domain name information of the entity comprises a fully qualified domain name.

According to some examples the method comprises using the reply from the entity for setting a request Uniform Resource Identifier for N32-f Hypertext Transfer Protocol Secure messages towards the entity.

According to some examples the method comprises, in response to receiving the reply from the entity, establishing the N32-f transport layer security connection towards the entity with a server name indication set to the domain name information received in the reply.

According to some examples the method comprises receiving from the entity information of an N32-c transport layer security connection that is correlated with the N32-f transport layer security connection.

According to some examples the method comprises sending an N32-c signalling request to the entity for termination of the N32-f transport layer security connection and the correlated N32-c transport layer security connection.

According to some examples the method comprises sending a request to the entity for renegotiation of the N32-f transport layer security connection and the correlated N32-c transport layer security connection.

According to some examples the method comprises receiving from the entity fully qualified domain name information for the N32-f transport layer security connection as one of: a wildcard transport layer security certificate; a transport layer security certificate applicable to a list of one or more valid fully qualified domain names.

According to some examples the N32-c handshake signalling procedure corresponds to a N32-c security capability negotiation.

According to some examples the apparatus comprises an initiating security edge protection proxy and the entity comprises a responding security edge protection proxy.

According to a fifth aspect there is provided a computer program comprising instructions for causing an apparatus to perform at least the following: initiating establishment of an N32-c transport layer security connection with an entity, the apparatus located in a first public land mobile network and the entity located in a second public land mobile network; sending from the apparatus to the entity on the N32-c transport layer security connection an N32-c handshake signalling message comprising domain name information of the apparatus to be used by the entity for establishing an N32-f transport layer security connection towards the apparatus; receiving a reply from the entity, the reply comprising domain name information of the entity to be used by the apparatus for establishing the N32-f transport layer security connection towards the entity; and using the domain name information received in the reply to establish the N32-f transport layer security connection towards the entity.

According to a sixth aspect there is provided a computer program comprising instructions stored thereon for performing at least the following: initiating establishment of an N32-c transport layer security connection between an apparatus and an entity, the apparatus located in a first public land mobile network and the entity located in a second public land mobile network; sending from the apparatus to the entity on the N32-c transport layer security connection an N32-c handshake signalling message comprising domain name information of the apparatus to be used by the entity for establishing an N32-f transport layer security connection towards the apparatus; receiving a reply from the entity, the reply comprising domain name information of the entity to be used by the apparatus for establishing the N32-f transport layer security connection towards the entity; and using the domain name information received in the reply to establish the N32-f transport layer security connection towards the entity.

According to a seventh aspect there is provided a non-transitory computer readable medium comprising program instructions for causing an apparatus to perform at least the following: initiating establishment of an N32-c transport layer security connection with an entity, the apparatus located in a first public land mobile network and the entity located in a second public land mobile network; sending from the apparatus to the entity on the N32-c transport layer security connection an N32-c handshake signalling message comprising domain name information of the apparatus to be used by the entity for establishing an N32-f transport layer security connection towards the apparatus; receiving a reply from the entity, the reply comprising domain name information of the entity to be used by the apparatus for establishing the N32-f transport layer security connection towards the entity; and using the domain name information received in the reply to establish the N32-f transport layer security connection towards the entity.

According to an eighth aspect there is provided a non-transitory computer readable medium comprising program instructions stored thereon for performing at least the following: initiating establishment of an N32-c transport layer security connection between an apparatus and an entity, the apparatus located in a first public land mobile network and the entity located in a second public land mobile network; sending from the apparatus to the entity on the N32-c transport layer security connection an N32-c handshake signalling message comprising domain name information of the apparatus to be used by the entity for establishing an N32-f transport layer security connection towards the apparatus; receiving a reply from the entity, the reply comprising domain name information of the entity to be used by the apparatus for establishing the N32-f transport layer security connection towards the entity; and using the domain name information received in the reply to establish the N32-f transport layer security connection towards the entity.

According to a ninth aspect there is provided an apparatus comprising means for performing: receiving from an entity a message initiating a setup of an N32-c transport layer security connection with the apparatus, the entity located in a first public land mobile network and the apparatus located in a second public land mobile network; receiving a N32-c handshake signalling message from the entity on the N32-c transport layer security connection, the N32-c handshake signalling message comprising domain name information of the entity to be used by the apparatus for establishing an N32-f transport layer security connection towards the entity; sending a reply to the entity, the reply comprising domain name information of the apparatus to be used by the entity for establishing the N32-f transport layer security connection towards the apparatus.

According to some examples the domain name information of the apparatus comprises a fully qualified domain name, and the domain name information of the entity comprises a fully qualified domain name.

According to some examples the means are further configured to receive a request from the entity to establish the N32-f transport layer security connection towards the apparatus, the request comprising a server name indication that is set to the domain name information sent in the reply by the apparatus for the N32-f transport layer security connection.

According to some examples a request for N32-f Hypertext Transfer Protocol Secure messages received from the entity comprises a Uniform Resource Identifier that is set to the domain name information sent in the reply by the apparatus for the N32-f transport layer security connection.

According to some examples the means are further configured to use the server name indication or the Uniform Resource Identifier to create a binding between the N32-f transport layer security connection and the correlated N32-c transport layer security connection.

According to some examples the means are further configured to send to the entity information of the N32-c transport layer security connection that is correlated with the N32-f transport layer security connection.

According to some examples the means are further configured to perform receiving a request from the entity for termination of the N32-f transport layer security connection and the correlated N32-c transport layer security connection.

According to some examples the means are further configured to perform receiving a request from the entity for renegotiation of the N32-f transport layer security connection and the correlated N32-c transport layer security connection.

According to some examples the means are further configured to send to the entity fully qualified domain name information for the N32-f transport layer security connection as one of: a wildcard transport layer security certificate transport layer security certificate applicable to a list of one or more valid fully qualified domain names.

According to some examples the N32-c handshake signalling procedure corresponds to a N32-c security capability negotiation.

According to some examples the apparatus comprises a responding security edge protection proxy and the entity comprises an initiating security edge protection proxy.

According to some examples the means comprises at least one processor; and at least one memory including computer program code, the at least one memory and computer program code configured to, with the at least one processor, cause the performance of the apparatus.

According to a tenth aspect there is provided an apparatus comprising at least one processor; and at least one memory including computer program code; the at least one memory and the computer program code configured to, with the at least one processor, cause the apparatus at least to perform: receiving from an entity a message initiating a setup of an N32-c transport layer security connection with the apparatus, the entity located in a first public land mobile network and the apparatus located in a second public land mobile network; receiving a N32-c handshake signalling message from the entity on the N32-c transport layer security connection, the N32-c handshake signalling message comprising domain name information of the entity to be used by the apparatus for establishing an N32-f transport layer security connection towards the entity; sending a reply to the entity, the reply comprising domain name information of the apparatus to be used by the entity for establishing the N32-f transport layer security connection towards the apparatus.

According to an eleventh aspect there is provided an apparatus comprising: circuitry for receiving from an entity a message initiating a setup of an N32-c transport layer security connection with the apparatus, the entity located in a first public land mobile network and the apparatus located in a second public land mobile network; circuitry for receiving a N32-c handshake signalling message from the entity on the N32-c transport layer security connection, the N32-c handshake signalling message comprising domain name information of the entity to be used by the apparatus for establishing an N32-f transport layer security connection towards the entity; circuitry for sending a reply to the entity, the reply comprising domain name information of the apparatus to be used by the entity for establishing the N32-f transport layer security connection towards the apparatus.

According to a twelfth aspect there is provided a method performed by an apparatus comprising: receiving from an entity a message initiating a setup of an N32-c transport layer security connection with the apparatus, the entity located in a first public land mobile network and the apparatus located in a second public land mobile network; receiving a N32-c handshake signalling message from the entity on the N32-c transport layer security connection, the N32-c handshake signalling message comprising domain name information of the entity to be used by the apparatus for establishing an N32-f transport layer security connection towards the entity; sending a reply to the entity, the reply comprising domain name information of the apparatus to be used by the entity for establishing the N32-f transport layer security connection towards the apparatus.

According to some examples the domain name information of the apparatus comprises a fully qualified domain name, and the domain name information of the entity comprises a fully qualified domain name.

According to some examples the method comprises receiving a request from the entity to establish the N32-f transport layer security connection towards the apparatus, the request comprising a server name indication that is set to the domain name information sent in the reply by the apparatus for the N32-f transport layer security connection.

According to some examples a request for N32-f Hypertext Transfer Protocol Secure messages received from the entity comprises a Uniform Resource Identifier that is set to the domain name information sent in the reply by the apparatus for the N32-f transport layer security connection.

According to some examples the method comprises using the server name indication or the Uniform Resource Identifier to create a binding between the N32-f transport layer security connection and the correlated N32-c transport layer security connection.

According to some examples the method comprises sending to the entity information of the N32-c transport layer security connection that is correlated with the N32-f transport layer security connection.

According to some examples the method comprises receiving a request from the entity for termination of the N32-f transport layer security connection and the correlated N32-c transport layer security connection.

According to some examples the method comprises receiving a request from the entity for renegotiation of the N32-f transport layer security connection and the correlated N32-c transport layer security connection.

According to some examples the method comprises sending to the entity fully qualified domain name information for the N32-f transport layer security connection as one of: a wildcard transport layer security certificate transport layer security certificate applicable to a list of one or more valid fully qualified domain names.

According to some examples the N32-c handshake signalling procedure corresponds to a N32-c security capability negotiation.

According to some examples the apparatus comprises a responding security edge protection proxy and the entity comprises an initiating security edge protection proxy.

According to a thirteenth aspect there is provided a computer program comprising instructions for causing an apparatus to perform at least the following: receiving from an entity a message initiating a setup of an N32-c transport layer security connection with the apparatus, the entity located in a first public land mobile network and the apparatus located in a second public land mobile network; receiving a N32-c handshake signalling message from the entity on the N32-c transport layer security connection, the N32-c handshake signalling message comprising domain name information of the entity to be used by the apparatus for establishing an N32-f transport layer security connection towards the entity; sending a reply to the entity, the reply comprising domain name information of the apparatus to be used by the entity for establishing the N32-f transport layer security connection towards the apparatus.

According to a fourteenth aspect there is provided a computer program comprising instructions stored thereon for performing at least the following: receiving from an entity a message initiating a setup of an N32-c transport layer security connection with an apparatus, the entity located in a first public land mobile network and the apparatus located in a second public land mobile network; receiving a N32-c handshake signalling message from the entity on the N32-c transport layer security connection, the N32-c handshake signalling message comprising domain name information of the entity to be used by the apparatus for establishing an N32-f transport layer security connection towards the entity; sending a reply to the entity, the reply comprising domain name information of the apparatus to be used by the entity for establishing the N32-f transport layer security connection towards the apparatus.

According to a fifteenth aspect there is provided a non-transitory computer readable medium comprising program instructions for causing an apparatus to perform at least the following: receiving from an entity a message initiating a setup of an N32-c transport layer security connection with the apparatus, the entity located in a first public land mobile network and the apparatus located in a second public land mobile network; receiving a N32-c handshake signalling message from the entity on the N32-c transport layer security connection, the N32-c handshake signalling message comprising domain name information of the entity to be used by the apparatus for establishing an N32-f transport layer security connection towards the entity; sending a reply to the entity, the reply comprising domain name information of the apparatus to be used by the entity for establishing the N32-f transport layer security connection towards the apparatus.

According to a sixteenth aspect there is provided a non-transitory computer readable medium comprising program instructions stored thereon for performing at least the following: receiving from an entity a message initiating a setup of an N32-c transport layer security connection with an apparatus, the entity located in a first public land mobile network and the apparatus located in a second public land mobile network; receiving a N32-c handshake signalling message from the entity on the N32-c transport layer security connection, the N32-c handshake signalling message comprising domain name information of the entity to be used by the apparatus for establishing an N32-f transport layer security connection towards the entity; sending a reply to the entity, the reply comprising domain name information of the apparatus to be used by the entity for establishing the N32-f transport layer security connection towards the apparatus.

BRIEF DESCRIPTION OF FIGURES

The invention will now be described in further detail, by way of example only, with reference to the following examples and accompanying drawings, in which.

DETAILED DESCRIPTION

Figure 1:
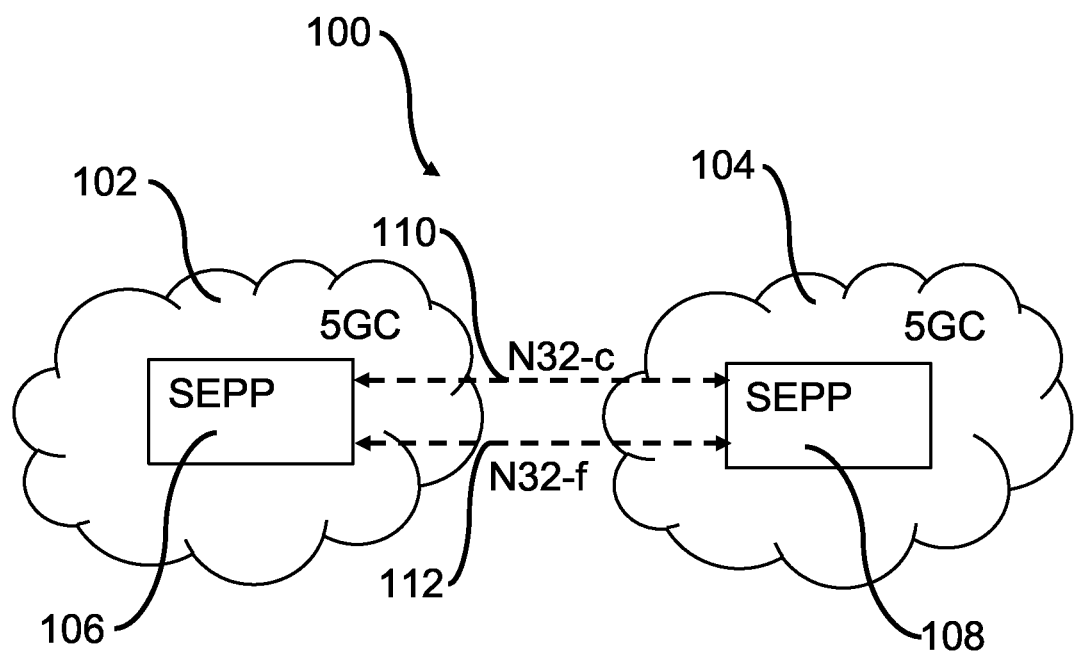
FIG. 1 shows inter-PLMN communication according to an example.

Before explaining in detail the examples, certain general principles of inter-network signalling are described with respect to FIG. 1.

FIG. 1 shows a communication system 100. Communication system 100 comprises a first network 102 and a second network 104. In examples, first network 102 may be a first 5GC network and second network 104 may be a second, different 5GC network. In examples, first network 102 may be considered to comprise a first PLMN and second network 104 may be considered to comprise a second, different PLMN. According to the example of FIG. 1, network 102 comprises a Security Edge Protection Proxy (SEPP) entity 106, and network 104 comprises a SEPP entity 108.

Communication between SEPPS 106 and 108 takes place over a first interface 110 and a second interface 112. In examples, the first interface 110 comprises an N32-c interface. The N32-c interface comprises a control plane interface between the SEPPs for performing initial handshake and negotiating parameters to be applied for the actual N32 message forwarding. For example, the N32-c interface may be used to negotiate protection and security policies to apply to HTTP messages exchanged between the two networks 102 and 104. In examples, the second interface 112 comprises an N32-f interface. In examples, the N32-f interface is used for forwarding communications between the SEPP entities 106 and 108. For example, the N32-f interface may be used for sending of JSON web encryption (JWE) and JSON web signatures (JWS) protected messages between SEPP 102 and SEPP 104. In examples, the N32-c and N32-f interfaces comprise transport layer security (TLS) connections.

In practice, an N32-c interface (e.g. first interface 110) has a corresponding N32-f interface (e.g. second interface 112). In practice, there may be multiple N32-c and N32-f interfaces within a system. As discussed in more detail below, there are problems in correlating an N32-c interface to its corresponding N32-f interface. Moreover, SEPP TLS profile is not defined; rather it is left to GSMA to make the definition.

When "PRotocol for N32 INterconnect Security" (PRINS) is used as a protocol for forwarding messages on N32-f connection, a mechanism has been defined to correlate N32-c connections and N32-f connections. Moreover, a mechanism for termination of N32-f connections via "N32-f Context Termination Procedure" has been defined when the N32-f connection is no longer required.

It is identified in the present disclosure that currently there is no mechanism available in 3GPP to correlate an N32-f TLS connection with the corresponding N32-c TLS connection. It is also identified in the present disclosure that correlation of these connections would be useful for several reasons, including:
  to enable any renegotiated policy for N32-c TLS to be applied to the related N32f TLS connection.
  to be able to tear down or terminate N32-f connection(s) associated to an N32-c connection;
  to be able to identify the N32-f connection(s) used for a specific PLMN, when a SEPP or roaming hub (RHUB) supports serving multiple PLMNs.

Thus, and as will be described in more detail below and in the accompanying drawings, there is disclosed a mechanism to correlate or associate one or more N32-c connections to respective one or more N32-f connections. In some examples, the correlation is between specific N32-c connection with one or more corresponding N32-f connections. In some examples, the procedure takes place when TLS security is negotiated for N32-f during the N32-c security negotiation. In examples, an extension to N32-c signalling is proposed which supports signalling from a first SEPP (initiating SEPP) to a second SEPP (peer or receiving SEPP). In some examples, the extension comprises the following to correlate an N32-c and N32-f connection:
  a TLS extension SNI (Server Name Indication) exchanged over N32-c for use for the setup of the N32-f TLS connection. In some examples, FQDN is packed in SNI field.
  hypertext transfer protocol (HTTP) application programming interface root (API root) to use for the N32-f connection
  wildcard certificates for the N32-f connection and/or
  Subject Alternative Name (SAN) with one or more host names/FQDN According to examples, the mechanism allows correlation of N32-c connection with N32-f connection at both TLS level (e.g. SNI) and HTTP level (e.g. API root in request uniform resource identifier (URI)).

Figure 2:
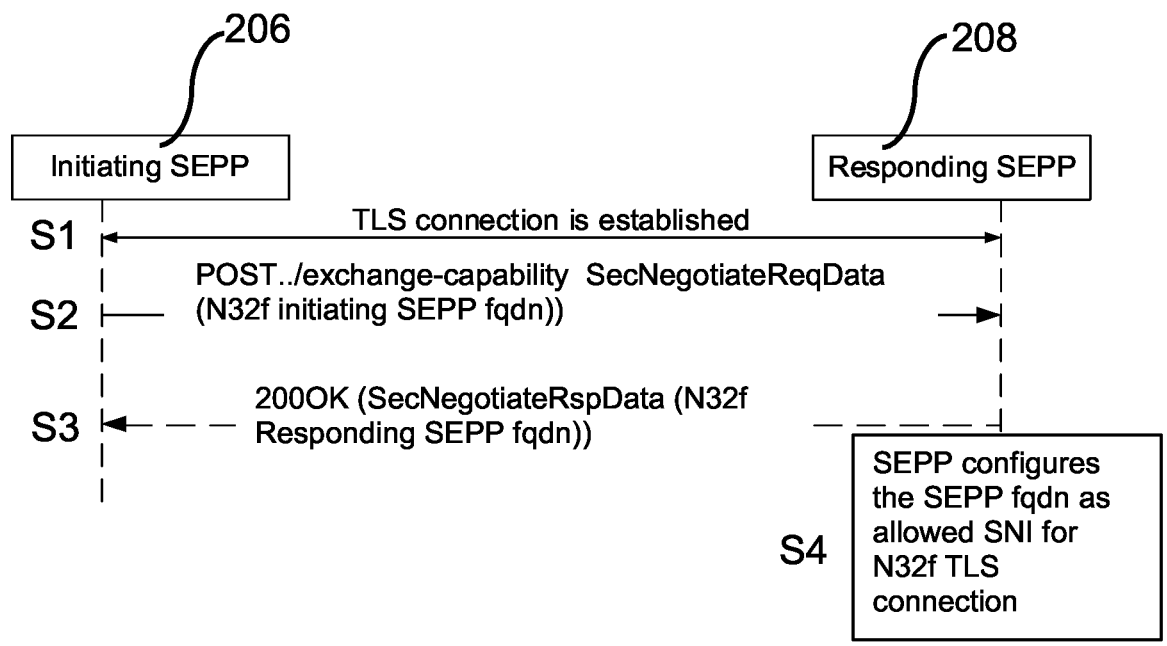
FIG. 2 is a signalling diagram according to an example.

FIG. 2 shows communication between an initiating (first) SEPP 206 and a responding (second) SEPP 208. By way of non-limiting example, the initiating SEPP 206 is located in a visited PLMN and responding SEPP 208 is located in a home PLMN.

At S1, a TLS connection is established for the N32-c connection between the initiating SEPP 206 and the responding SEPP 208. S1 may be considered a N32-c "handshake" signalling procedure, in some examples. See clause 5.2 "N32 Handshake Procedures (N32-c)" of 3GPP TS 29.573.

S2 and S3 show a Security Capability Negotiation Procedure between the initiating SEPP 206 and the responding SEPP 208 over the established N32-c. The standard Security Capability Negotiation Procedure is defined in TS 29.573.

According to the example of FIG. 2, at S2 and as part of the Security Capability Negotiation Procedure over N32-c, the initiating SEPP 206 sends domain name information to the responding SEPP. The domain name information comprises Server Name Indication to be used by the responding SEPP during the set-up of N32-f TLS connection. According to some examples the domain name information comprises a fully qualified domain name (FQDN). Therefore, in examples it may be considered that initiating SEPP 206 sends an N32-f FQDN to SEPP 208. In other words, initiating SEPP 206 sends to responding SEPP 208 information of the N32-f connection FQDN the initiating SEPP 206 requests the responding SEPP 208 to use when setting up the N32-f TLS connection. In examples, this assumes that TLS security is supported and the initiating SEPP 206 supports correlating N32-f and N32-c connections.

According to some examples the FQDN comprises a fixed-part and a "label" part. The "label" part may also be referred to as a dynamic part or a non-fixed part. According to some examples the label part prepends the dynamic part.

For example, the fixed part could be of the form "sepp-n32f.5gc.mnc123.mcc012.3gppnetwork.org", or more broadly "sepp-n32f.operator.com". Here, "sepp" may include an identifier of the initiating SEPP and "operator" may include an identifier of the network operator of the initiating SEPP. Therefore, it will be appreciated that by "fixed" is meant fixed format, and that the content of the fixed part may vary dependent on scenario (e.g. dependent on SEPP identity and operator identity).

According to some examples, the label part comprises a wildcard value or wildcard fqdn. For example, the label part may be of the form "N32c-123" where "123" is a dynamic value.

Therefore, for example, the resulting FQDN (i.e. fixed part plus dynamic part) may be of the form "n32c-123.sepp-n32f.5gc.mnc123.mcc012.3gppnetwork.org" or more broadly "n32c-123.sepp-n32f.operator.com". In examples, initiating SEPP 206 stores this FQDN information in its own memory/configuration.

At S3 the responding SEPP 208 indicates to the initiating SEPP 206 the N32-f connection FQDN the responding SEPP 208 requests the initiating SEPP 206 to use when setting up the N32-f TLS connection. In examples, this assumes that TLS security is supported and the responding SEPP 208 supports correlating N32-f and N32-c connections. In some examples, the responding SEPP 208 sends the FQDN in a 200 OK message. The N32-f connection FQDN sent by the responding SEPP 208 to the initiating SEPP 206 may comprise a fixed part and a dynamic part, as described above for initiating SEPP.

At S4, in this example, the responding SEPP 208 configures the resulting FQDN as an "allowed SNI" for N32-f TLS connection.

Therefore, in some examples, it may be considered that initiating SEPP 206 has a list of fqdn configured as "AllowedSNI" that it shares with responding SEPP 208. Similarly, responding SEPP 208 has a list of fqdn configured as "AllowedSNI" that it shares with initiating SEPP 206.

It will be noted that during the N32-c handshake procedure, each N32-c connection may be assigned a different FQDN based on a wildcard value chosen by the responding SEPP 208, or selected from a list of FQDN's supported by responding SEPP 208.

According to some examples, the operator may provision a wildcard FQDN in its domain name system (DNS) so as to resolve all FQDNs with the same fixed part and any prepended label to the same SEPP entity. For example:

n32f-resp-fqdn=<n32c-123.sepp-n32f.operator.com>
WildCard FQDN=<n32c-*.sepp-n32f.operator.com>

Where * is the wildcard value. Of course, the n32c-prefix and sepp-n32f.operator.com values are just given as an example, and may differ in practice.

Table 1 below shows in more detail attributes that may be contained in the SecNegotiateReqData message at S2 of FIG. 2.

TABLE 1

| Attribute name | Data type | P | Cardinality | Description |
| --- | --- | --- | --- | --- |
| sender | Fqdn | M | 1 | This IE shall uniquely identify the SEPP that is sending the request. This IE is used to store the negotiated security capability against the right SEPP. |
| supportedSecCapabilityList | array(SecurityCapability) | M | 1 ... N | This IE shall contain the list of security capabilities that the requesting SEPP supports. |
| 3GppSbiTargetApiRootSupported | boolean | C | 0 ... 1 | This IE should be present and indicate that the 3gpp-Sbi-Target-apiRoot HTTP header is supported, if TLS security is supported for N32f message forwarding.<br>When present, it shall indicate if TLS security using the 3gpp-Sbi-Target-apiRoot HTTP header is supported:<br>true: supported<br>false (default): not supported |
| plmnIdList | array(PlmnId) | O | 1 ... N | A list of PLMN IDs associated with the SEPP, which is sending the request. The list to be stored by the receiving SEPP in a N32-f Context (see clause 5.9.3 in 3GPP TS 33.501 [6]) |
| n32fFqdn | Fqdn | C | 0 ... 1 | If present, this IE shall contain the initiating SEPP fqdn to use to set up the N32-f TLS connection. It may be present if the supportedSecCapabilityList includes "TLS". |

Table 2 below shows in more detail attributes that may be contained in the SecNegotiateRspData message at S3 of FIG. 2.

TABLE 2

| Attribute name | Data type | P | Cardinality | Description |
|---|---|---|---|---|
| sender | Fqdn | M | 1 | This IE shall uniquely identify the SEPP that is sending the response. This IE is used to store the negotiated security capability against the right SEPP. |
| selectedSecCapability | SecurityCapability | M | 1 | This IE shall contain the security capability selected by the responding SEPP. |
| 3GppSbiTargetApiRoot Supported | boolean | C | 0 . . . 1 | This IE should be present and indicate that the 3gpp-Sbi-Target-apiRoot HTTP header is supported, if TLS security is negotiated for N32f message forwarding and the initiating SEPP indicated support of this header. When present, it shall indicate if TLS security using the 3gpp-Sbi-Target-apiRoot HTTP header is supported: true: supported false (default): not supported |
| plmnIdList | array(PlmnId) | O | 1 . . . N | A list of PLMN IDs associated with the SEPP, which is sending the response. The list to be stored by the receiving SEPP in a N32-f Context (see clause 5.9.3 in 3GPP TS 33.501 [6]) |
| n32fFqdn | Fqdn | C | 0 . . . 1 | If present, this IE shall contain the responding SEPP fqdn to use to set up the N32-f TLS connection. It may be present when selectedSecCapability sets to "TLS". |

The procedure after the "Security Capability Negotiation Procedure over N32-c" shown in FIG. 2 will now be described in more detail with respect to FIG. 3, which shows communication between initiating SEPP 206, DNS 220 and responding SEPP 208 for the establishment of the N32-f connection and its correlation with the N32-c connection.

At S1 and S2 the initiating SEPP 206 resolves the received N32f SEPP FQDN (i.e. the FQDN received at S3 in FIG. 2). To do this the initiating SEPP 206 sends a query to DNS at S1, and receives a reply from the DNS 220 at S2. To provide the reply at S2, in some examples the DNS 220 is configured e.g. using a wildcard FQDN. An example look-up-table is shown below in Table 3, where * represents the wildcard value.

TABLE 3

| Host | Type | Points to: | TTL |
|---|---|---|---|
| *.sepp-n32f.operator.com | A | IPv4 address of SEPP | 1 Hour |
| *.sepp-n32f.operator.com | AAAA | IPv6 address of SEPP | 1 Hour |

In some examples, the trigger for the initiating SEPP to initiate establishment of the N32-f interface is when the initiating SEPP 206 has traffic to send to responding SEPP 208.

It is to be noted that in some examples the operator provisions wildcard DNS entries, mapping all requests "*.sepp-n32f.operator.com" to the SEPP addresses.

At S3, as part of N32-f TLS "handshake" the initiating SEPP 206 uses the FQDN value received as part of N32-c Security Capability Negotiation Procedure (i.e. the FQDN received at S3 in FIG. 2). In some examples the FQDN values are comprised in TLS SNI extension server_name attribute. In some examples, when this SNI is received at the initiating SEPP 206 from the responding SEPP 208, it is used during the setup of the TLS connection of N32-f signalling i.e. as part of the TLS handshake procedure of the N32-f connection. As shown, in some examples this information is then comprised in a "Client Hello" message from initiating SEPP 206 to responding SEPP 208.

At S4, the responding SEPP 208 already has allowed SNIs configured via N32-c. If SNI value is matched with any of the allowed SNI values, then TLS handshake procedure proceeds further. But if SNI value is not matched, the TLS handshake is rejected (as per the RFC 2818). That is the responding SEPP 208 selects an N32-c context based on received FQDN information from initiating SEPP 206.

When receiving the TLS Client Hello and HTTP request, the receiving SEPP can bind the TLS connection and HTTP requests to the N32-c connection by using specific SNI (TLS) and apiRoot (HTTP) i.e. "n32c-123.sepp-n32f.operator.com". As per existing principle, the sending SEPP may set the SNI to the same value as the apiRoot of the HTTPS request. In other words, the responding SEPP 208 makes the correlation (or association, or binding) between N32-c TLS connection and correlated N32-f TLS connection.

S5 and S6 show two alternatives for how the responding SEPP 208 can respond to the initiating SEPP 206, after the binding.

In the first option, shown at S5, the responding SEPP 208 sends to the initiating SEPP 206 a list of supported FQDNs. This response may be in the form of a certificate: certificate <SNA=<List of FQDNs supported>. An example SNA certificate is shown below:

| SNA Certificate |
|---|
| Certificate: Data: [...] X509v3 extensions: [...] X509v3 Subject Alternative Name: DNS: n32c-1.sepp-n32f.operator.com, DNS: n32c-2.sepp-n32f.operator.com DNS: n32c-3.sepp-n32f.operator.com |

In the second option, shown at S6, the responding SEPP returns a wildcard TLS certificate e.g. "*. sepp-n32f.5gc.mnc123.mcc012.3gppnetwork.org", or "*. sepp-n32f.operator.com". An example wildcard certificate is shown below.

| WildCard Certificate |
|---|
| Certificate:<br>  Data:<br>    [...]<br>    X509v3 extensions:<br>    [...]<br>      X509v3 Subject Alternative Name:<br>      DNS: *.sepp-n32f.operator.com |

Figure 4:
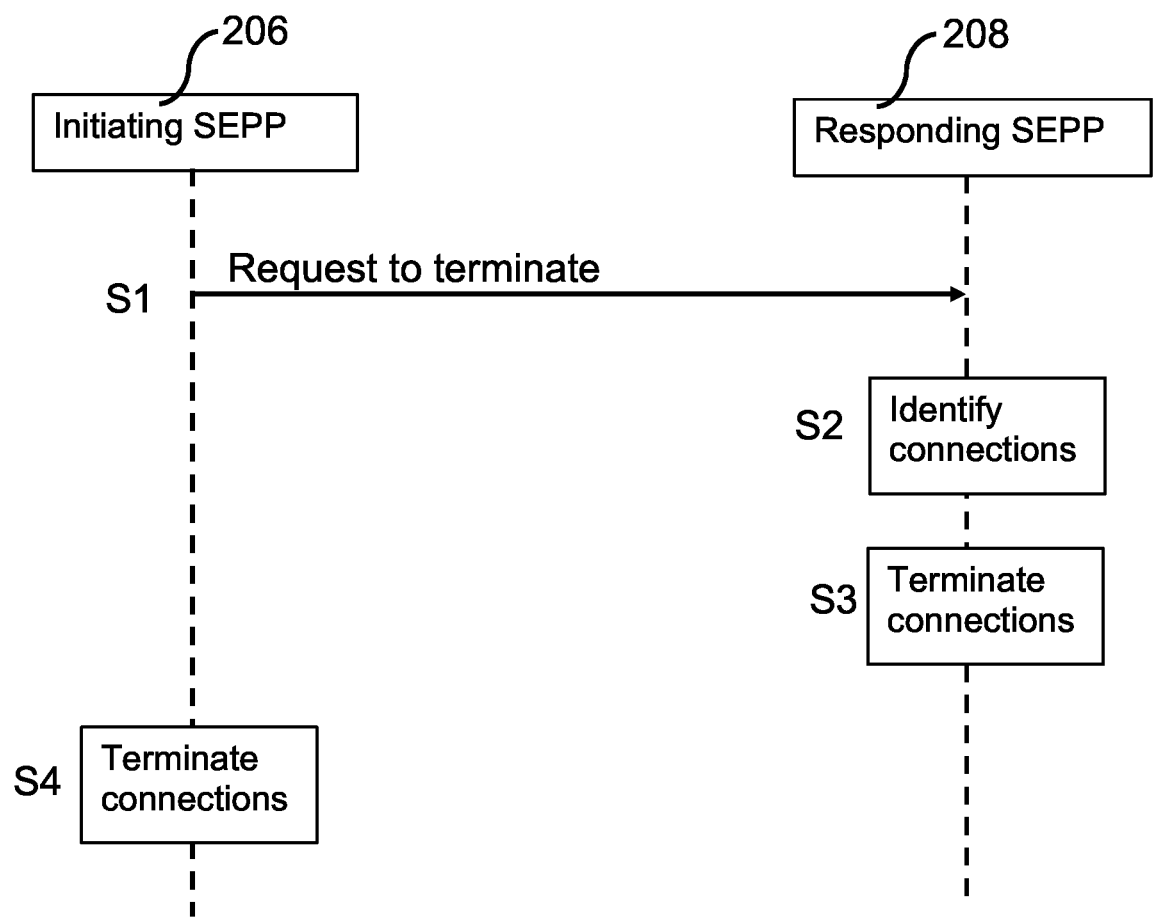
FIG. 4 is a signalling diagram according to an example.

FIG. 4 shows example procedure where a SEPP wishes to terminate an N32-c connection and an associated N32-f TLS connection.

At S1, initiating SEPP 206 sends a N32-c signalling request to responding SEPP 208 to terminate N32-c connection and associated N32-f connection(s).

Figure 3:
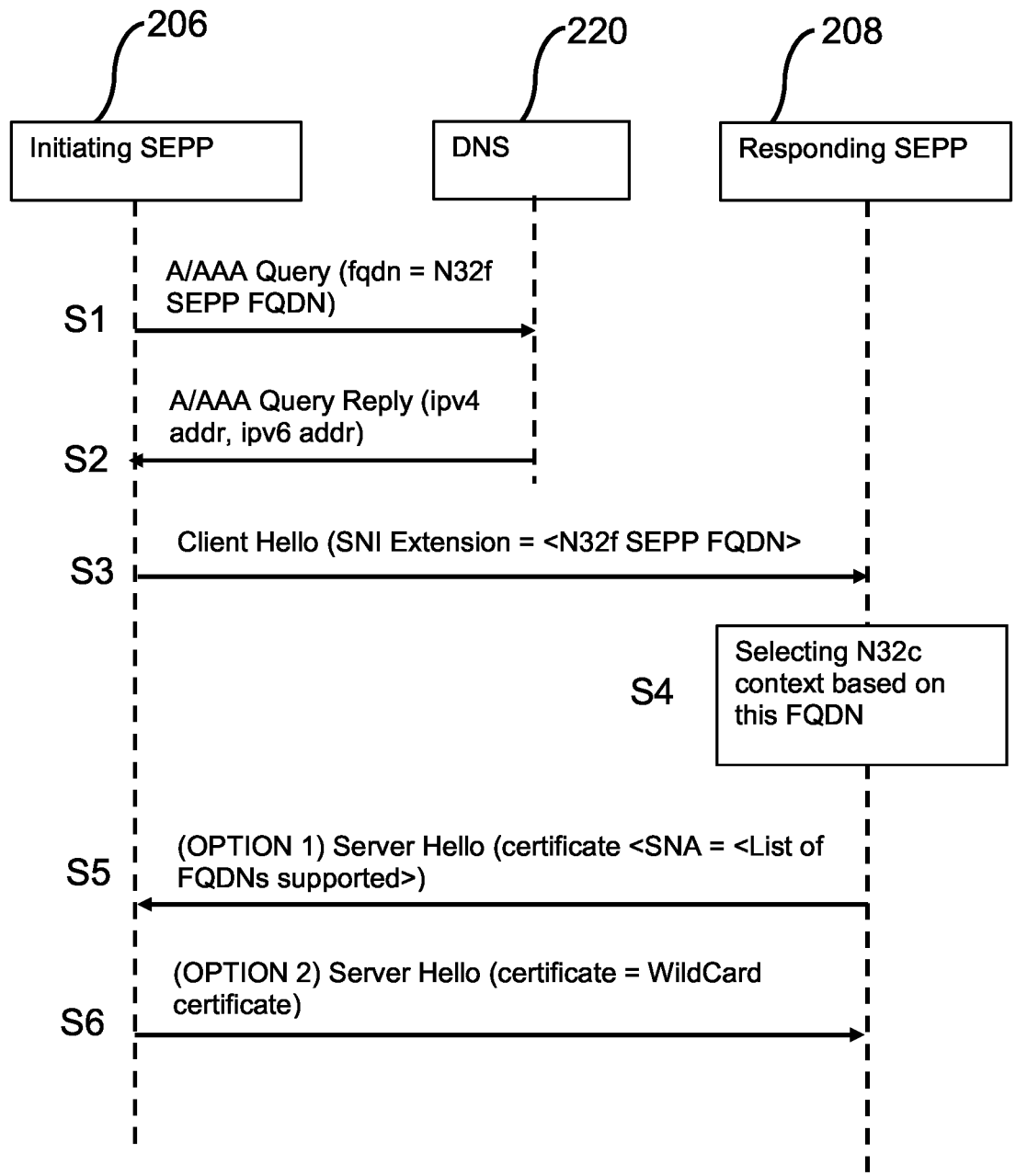
FIG. 3 is a signalling diagram according to an example.

It is to be noted that responding SEPP 208 had already received the initiating SEPP 206's N32-f FQDN that was sent earlier (see e.g. FIGS. 2 and 3). Using this information, at S2 the responding SEPP 208 identifies the TLS connections that it had originated towards the initiating SEPP 206.

As shown at S3, the responding SEPP 208 terminates these connections.

Likewise, the initiating SEPP 206 may terminate all the TLS connections it had originated towards the responding SEPP 208, as shown at S4.

For termination of a connection, in some examples in the allowed SNI list, FQDN is removed and existing connections are drained and terminated. In some examples, new connections are not allowed.

In some examples, re-negotiation of N32-c connection and an associated N32-f TLS connection may be similar to termination procedure. For example, at S1 the request may be a request for re-negotiation rather than a request for termination, and S3 and S4 may comprise re-negotiation of the connections rather than termination of the connections.

A non-limiting worked example is provided below to further assist with understanding the principles.

An initiating SEPP 206 supports PLMN1 and PLMN2. To negotiate the security policy for PLMN1, the initiating SEPP 206 invokes the Security Capability Negotiation procedure. In this procedure, the initiating SEPP 206 shares the n32fFqdn="PLMN1.sepp-n32f.ABC.com" to the responding SEPP 208. The responding SEPP 208 selects available fqdn for N32f, e.g. n32fFqdn="PLMN2.sepp-n32f.XYZ.com", and shares the same to the initiating SEPP 206. Now, the initiating SEPP 206 creates N32f TLS connection. To do this, initiating SEPP 206 sends "Client Hello" message with SNI=PLMN2.sepp1-n32f.XYZ.com to responding SEPP 208. The responding SEPP 208 is able to correlate the N32f with N32c session via this SNI and respond with "Server Hello" message that includes Wildcard certification or SNA with the list of fqdns.

If the initiating SEPP 206 wants to negotiate the security policy for PLMNx with PLMN2, then the initiating SEPP 206 invokes the Security Capability Negotiation procedure again. In this procedure, the initiating SEPP 206 shares the n32fFqdn="PLMNx.sepp-n32f.ABC.com" to the responding SEPP 208 and the responding SEPP 208 selects available fqdn for N32f, e.g. n32fFqdn="PLMN2a.sepp-n32f.XYZ.com" and shares the same to the initiating SEPP 206. Now, the initiating SEPP 206 creates N32 TLS connection. Therefore, initiating SEPP 206 sends Client Hello with SNI=PLMN2a.sepp1-n32f.XYZ.com. The responding SEPP 208 is able to correlate the N32f with N32c session via this SNI and respond with "Server Hello" message that includes Wildcard certification or SNA with the list of fqdns.

When the initiating SEPP 206 wishes to terminate an N32-c connection and associated N32-f TLS connections for PLMN1 with PLMN2, SEPP 206 initiates Security Capability Negotiation procedure where the initiating SEPP 206 shares the supportedSecCapabilityList=NULL. Using the initiating SEPP's 206 n32fFqdn that it had received during the earlier N32-c handshake (i.e. PLMN1.sepp-n32f.ABC.com), the responding SEPP 208 identifies the TLS connections that it had originated towards the initiating SEPP 206 and terminates all these N32-f TLS connections. Likewise, the initiating SEPP 206 can terminate all the N32-f TLS connections it had originated towards the responding SEPP 208. Here, In the allowed SNI list of responding SEPP 208, PLMN2a.sepp-n32f.XYZ.com is removed and existing connections are drained and terminated. And, according to some examples new connections are not allowed for the configured time duration. Similarly, In the allowed SNI list of responding SEPP 206, PLMN1.sepp-n32f.ABC.com is removed and existing connections are drained and terminated.

Figure 5:
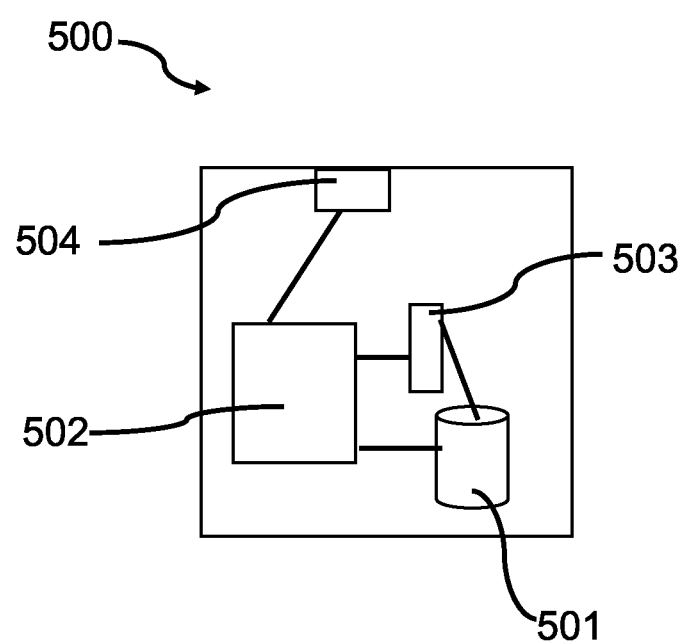
FIG. 5 shows parts of a control apparatus according to an example.

FIG. 5 shows an example of a control apparatus for a communication system, for example to be coupled to and/or for controlling a station of an access system, such as a RAN node, e.g. a base station, gNB, a central unit of a cloud architecture or a node of a core network such as an MME or S-GW, a scheduling entity such as a spectrum management entity, or a server or host. The control apparatus of FIG. 5 may for example comprise or host an SEPP or a DNS. The control apparatus may be integrated with or external to a node or module of a core network or RAN. The control apparatus 500 can be arranged to provide control on communications in the service area of the system. The control apparatus 500 comprises at least one memory 501, at least one data processing unit 502, 503 and an input/output interface 504. Via the interface the control apparatus can be coupled to a receiver and a transmitter of the base station. The receiver and/or the transmitter may be implemented as a radio front end or a remote radio head. For example, the control apparatus 500 or processor 501 can be configured to execute an appropriate software code to provide the control functions.

Figure 6:
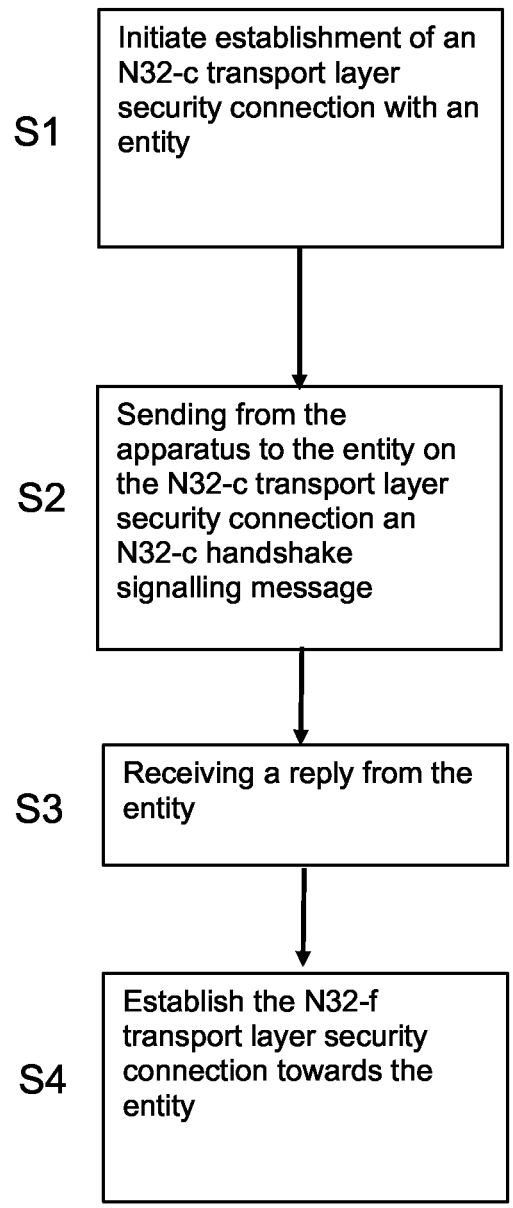
FIGS. 6 and 7 are method flow charts according to examples.

FIG. 6 is a method flow chart according to an example. The flow chart of FIG. 6 is viewed from the perspective of initiating SEPP 206.

At S1, the method comprises initiating establishment of an N32-c transport layer security connection with an entity, the apparatus located in a first public land mobile network and the entity located in a second public land mobile network.

At S2 the method comprises sending from the apparatus to the entity on the N32-c transport layer security connection an N32-c handshake signalling message comprising domain name information of the apparatus to be used by the entity for establishing an N32-f transport layer security connection towards the apparatus.

At S3 the method comprises receiving a reply from the entity, the reply comprising domain name information of the entity to be used by the apparatus for establishing the N32-f transport layer security connection towards the entity. At S4 the method comprises using the domain name information received in the reply to establish the N32-f transport layer security connection towards the entity.

Figure 7:
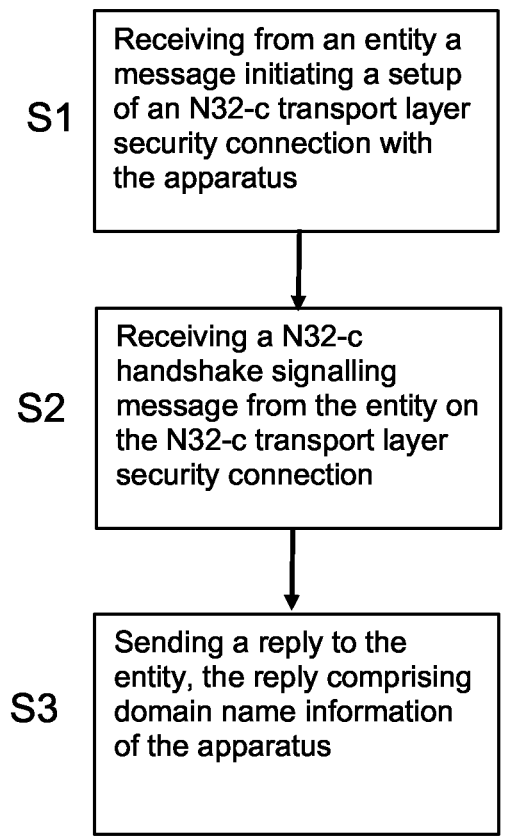

FIG. 7 is a method flow chart according to an example. The flow chart of FIG. 7 is viewed from the perspective of responding SEPP 208.

At S1 the method comprises receiving from an entity a message initiating a setup of an N32-c transport layer security connection with the apparatus, the entity located in a first public land mobile network and the apparatus located in a second public land mobile network.

At S2 the method comprises receiving a N32-c handshake signalling message from the entity on the N32-c transport layer security connection, the N32-c handshake signalling message comprising domain name information of the entity to be used by the apparatus for establishing an N32-f transport layer security connection towards the entity.

At S3 the method comprises sending a reply to the entity, the reply comprising domain name information of the apparatus to be used by the entity for establishing the N32-f transport layer security connection towards the apparatus.

Figure 8:
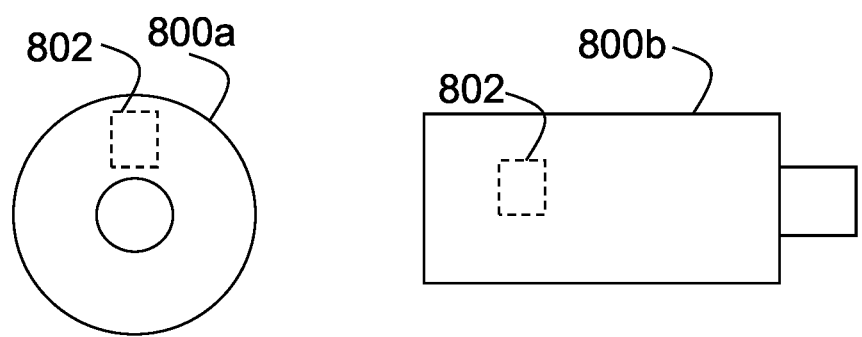
FIG. 8 shows a schematic representation of a non-volatile memory medium storing instructions which when executed by a processor allow a processor to perform one or more of the steps of the methods of some embodiments.

FIG. 8 shows a schematic representation of non-volatile memory media 800a (e.g. computer disc (CD) or digital versatile disc (DVD)) and 800b (e.g. universal serial bus (USB) memory stick) storing instructions and/or parameters 802 which when executed by a processor allow the processor to perform one or more of the steps of the methods of FIGS. 6 to 7. In general, the various embodiments may be implemented in hardware or special purpose circuits, software, logic or any combination thereof. Some aspects of the disclosure may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As used in this application, the term "circuitry" may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation. This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The embodiments of this invention may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed, there is a further embodiment comprising a combination of one or more embodiments with any of the other embodiments previously discussed.

The invention claimed is:

1. An apparatus comprising:
at least one processor,
at least one memory storing instructions that, when executed by the at least one processor, cause the apparatus at least to:
initiate establishment of an N32-c transport layer security connection with an entity, the apparatus located in a first public land mobile network and the entity located in a second public land mobile network;
send from the apparatus to the entity on the N32-c transport layer security connection an N32-c handshake signalling message comprising domain name information of the apparatus to be used by the entity for establishing an N32-f transport layer security connection towards the apparatus;
receive a reply from the entity, the reply comprising domain name information of the entity to be used by the apparatus for establishing the N32-f transport layer security connection towards the entity; and
use the domain name information received in the reply to establish the N32-f transport layer security connection towards the entity.

2. The apparatus according to claim 1, wherein the domain name information of the apparatus comprises a fully qualified domain name, and the domain name information of the entity comprises a fully qualified domain name.

3. The apparatus according to claim 1, is further caused to use the domain name information received in the reply from the entity for setting a request Uniform Resource Identifier for N32-f Hypertext Transfer Protocol Secure messages sent towards the entity.

4. The apparatus according to claim 1, is further caused to, in response to receiving the reply from the entity, establish the N32-f transport layer security connection towards the entity with a server name indication set to the domain name information received in the reply.

5. The apparatus according to claim 1, is further caused to receive from the entity information of an N32-c transport layer security connection that is correlated with the N32-f transport layer security connection.

6. The apparatus according to claim 5, is further caused to send a N32-c signalling request to the entity for termination of the N32-f transport layer security connection and the correlated N32-c transport layer security connection.

7. The apparatus according to claim 5, is further caused to send a request to the entity for renegotiation of the N32-f transport layer security connection and the correlated N32-c transport layer security connection.

8. The apparatus according to claim 1, is further caused to receive from the entity fully qualified domain name information for the N32-f transport layer security connection as one of: a wildcard transport layer security certificate; or a transport layer security certificate applicable to a list of one or more valid fully qualified domain names.

9. The apparatus according to claim 1, wherein the N32-c handshake signalling procedure correspond to a N32-c security capability negotiation.

10. The apparatus according to claim 1, wherein the apparatus comprises an initiating security edge protection proxy and the entity comprises a responding security edge protection proxy.

11. An apparatus comprising:
at least one processor,
at least one memory storing instructions that, when executed by the at least one processor, cause the apparatus at least to:
receive from an entity a message initiating a setup of an N32-c transport layer security connection t with the apparatus, the entity located in a first public land mobile network and the apparatus located in a second public land mobile network;
receive a N32-c handshake signalling message from the entity on the N32-c transport layer security connection, the N32-c handshake signalling message comprising domain name information of the entity to be used by the apparatus for establishing an N32-f transport layer security connection towards the entity;
send a reply to the entity, the reply comprising domain name information of the apparatus to be used by the entity for establishing the N32-f transport layer security connection towards the apparatus.

12. The apparatus according to claim 11, wherein the domain name information of the apparatus comprises a fully qualified domain name, and the domain name information of the entity comprises a fully qualified domain name.

13. The apparatus according to claim 11, is further caused to receive a request from the entity to establish the N32-f transport layer security connection towards the apparatus, the request comprising a server name indication that is set to the domain name information sent in the reply by the apparatus for the N32-f transport layer security connection.

14. The apparatus according to claim 13, wherein the request for N32-f Hypertext Transfer Protocol Secure messages received from the entity comprises a Uniform Resource Identifier that is set to the domain name information sent in the reply by the apparatus for the N32-f transport layer security connection.

15. The apparatus according to claim 14, is further caused to use the server name indication or the Uniform Resource Identifier to create a binding between the N32-f transport layer security connection and the correlated N32-c transport layer security connection.

16. The apparatus according to claim 15, is further caused to send to the entity information of the N32-c transport layer security connection that is correlated with the N32-f transport layer security connection.

17. The apparatus according to claim 16, is further caused to receive a request from the entity for termination of the N32-f transport layer security connection and the correlated N32-c transport layer security connection.

18. The apparatus according to claim 16, is further caused to receive a request from the entity for renegotiation of the N32-f transport layer security connection and the correlated N32-c transport layer security connection.

19. The apparatus according to claim 11, is further caused to send to the entity fully qualified domain name information for the N32-f transport layer security connection as one of: a wildcard transport layer security certificate; or a transport layer security certificate applicable to a list of one or more valid fully qualified domain names.

20. A method performed by an apparatus, comprising:
initiating establishment of an N32-c transport layer security connection with an entity, the apparatus located in a first public land mobile network and the entity located in a second public land mobile network;
sending from the apparatus to the entity on the N32-c transport layer security connection an N32-c handshake signalling message comprising domain name information of the apparatus to be used by the entity for establishing an N32-f transport layer security connection towards the apparatus;
receiving a reply from the entity, the reply comprising domain name information of the entity to be used by the apparatus for establishing the N32-f transport layer security connection towards the entity; and using the domain name information received in the reply to establish the N32-f transport layer security connection towards the entity.

\* \* \* \* \*